US012660728B2

(12) United States Patent
Shearer et al.

(10) Patent No.: US 12,660,728 B2
(45) Date of Patent: Jun. 23, 2026

(54) WORKING MACHINE WITH TRANSPORTATION CONFIGURATION ACTUATOR USED FOR WING LEVELING WHILE WORKING THE GROUND

(71) Applicant: Kubota Corporation, Naniwa-ku (JP)

(72) Inventors: Scott Shearer, Fort Worth, TX (US); Andrew Klopfenstein, Fort Worth, TX (US); Santiago Avila, Fort Worth, TX (US); Greg Arnett, Fort Worth, TX (US)

(73) Assignee: Kubota Corporation, Osaka (JP)

( * ) Notice: Subject to any disclaimer, the term of this patent is extended or adjusted under 35 U.S.C. 154(b) by 374 days.

(21) Appl. No.: 18/231,200

(22) Filed: Aug. 7, 2023

(65) Prior Publication Data

US 2024/0040945 A1     Feb. 8, 2024

Related U.S. Application Data

(60) Provisional application No. 63/396,180, filed on Aug. 8, 2022, provisional application No. 63/396,187, filed on Aug. 8, 2022.

(51) Int. Cl.
*A01B 63/32*     (2006.01)
*A01B 63/10*     (2006.01)

(52) U.S. Cl.
CPC .............. *A01B 63/32* (2013.01); *A01B 63/10* (2013.01)

(58) Field of Classification Search
CPC ....... A01B 63/32; A01B 63/10; A01B 63/102; A01B 63/008; A01B 63/111; A01B 63/28; A01B 73/044
See application file for complete search history.

(56) References Cited

U.S. PATENT DOCUMENTS

| | | | |
|---|---|---|---|
| 4,712,622 A | 12/1987 | Birkenbach et al. | |
| 5,992,535 A | 11/1999 | Bierl et al. | |
| 9,609,800 B2 | 4/2017 | Henry | |
| 10,561,052 B2 | 2/2020 | Barrick et al. | |
| 10,736,255 B2 | 8/2020 | Czapka et al. | |
| 10,752,237 B2 | 8/2020 | Peterson et al. | |

(Continued)

*Primary Examiner* — Joseph M Rocca
*Assistant Examiner* — Robert E Pezzuto
(74) *Attorney, Agent, or Firm* — Schwabe Williamson & Wyatt

(57) ABSTRACT

Some embodiments may include a working machine comprising 1) a frame assembly including first and second sections, 2) ground implements to work a ground surface, the first section including at least one first implement of the ground implements and the second section including at least one second different implement of the ground implements, respectively, and 3) a transportation system including transportation devices and at least one actuator to pivotally or hingeably move one part of the working machine relative to another part of the working machine; the working machine further including: at least one sensor to produce at least one measurement indicative of a degree of engagement of the at least one first implement or the at least one second implement with a corresponding part of the ground surface; and one or more processors to operate the at least one actuator of the transportation system while the machine is working the ground surface, based on the at least one measurement. Other embodiments may be disclosed and/or claimed.

19 Claims, 10 Drawing Sheets

(56) References Cited

U.S. PATENT DOCUMENTS

| 10,925,204 | B2 | 2/2021 | Sporrer et al. | |
| 2013/0068489 | A1 | 3/2013 | Blunier et al. | |
| 2013/0081828 | A1 | 4/2013 | Tuttle et al. | |
| 2015/0156950 | A1 | 6/2015 | Henry | |
| 2018/0153088 | A1* | 6/2018 | Sporrer | A01B 63/32 |
| 2020/0053943 | A1 | 2/2020 | Becker et al. | |
| 2020/0060062 | A1 | 2/2020 | Sporrer et al. | |
| 2020/0084951 | A1* | 3/2020 | Fanshier | A01B 63/102 |
| 2020/0260632 | A1 | 8/2020 | Long et al. | |
| 2021/0059094 | A1 | 3/2021 | Barrick | |
| 2021/0068331 | A1 | 3/2021 | Sporrer et al. | |
| 2021/0084804 | A1 | 3/2021 | Stanhope et al. | |
| 2021/0084805 | A1 | 3/2021 | Cozza et al. | |
| 2021/0120726 | A1 | 4/2021 | Barrick et al. | |
| 2023/0036264 | A1* | 2/2023 | Weis | A01B 63/32 |

* cited by examiner

25

26

Inertial measurement
unit

GNSS receiver

27

Transportation system     30

Signal to control actuators to
provide desired ground
engagement

29

Controller

21

On-implement sensor system for producing
measurements indicative of a degree of
engagement of ground implements with the
ground

120

100

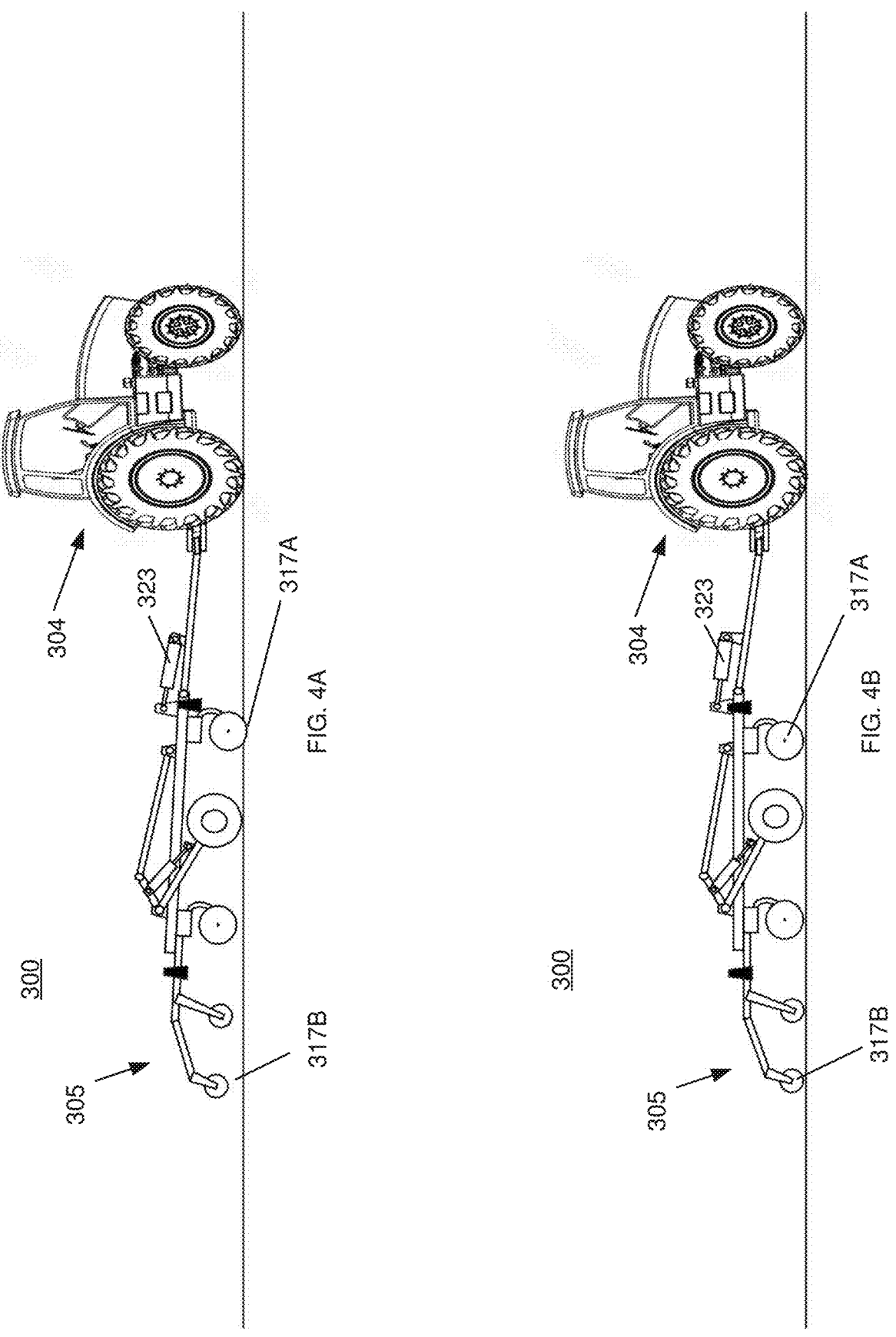

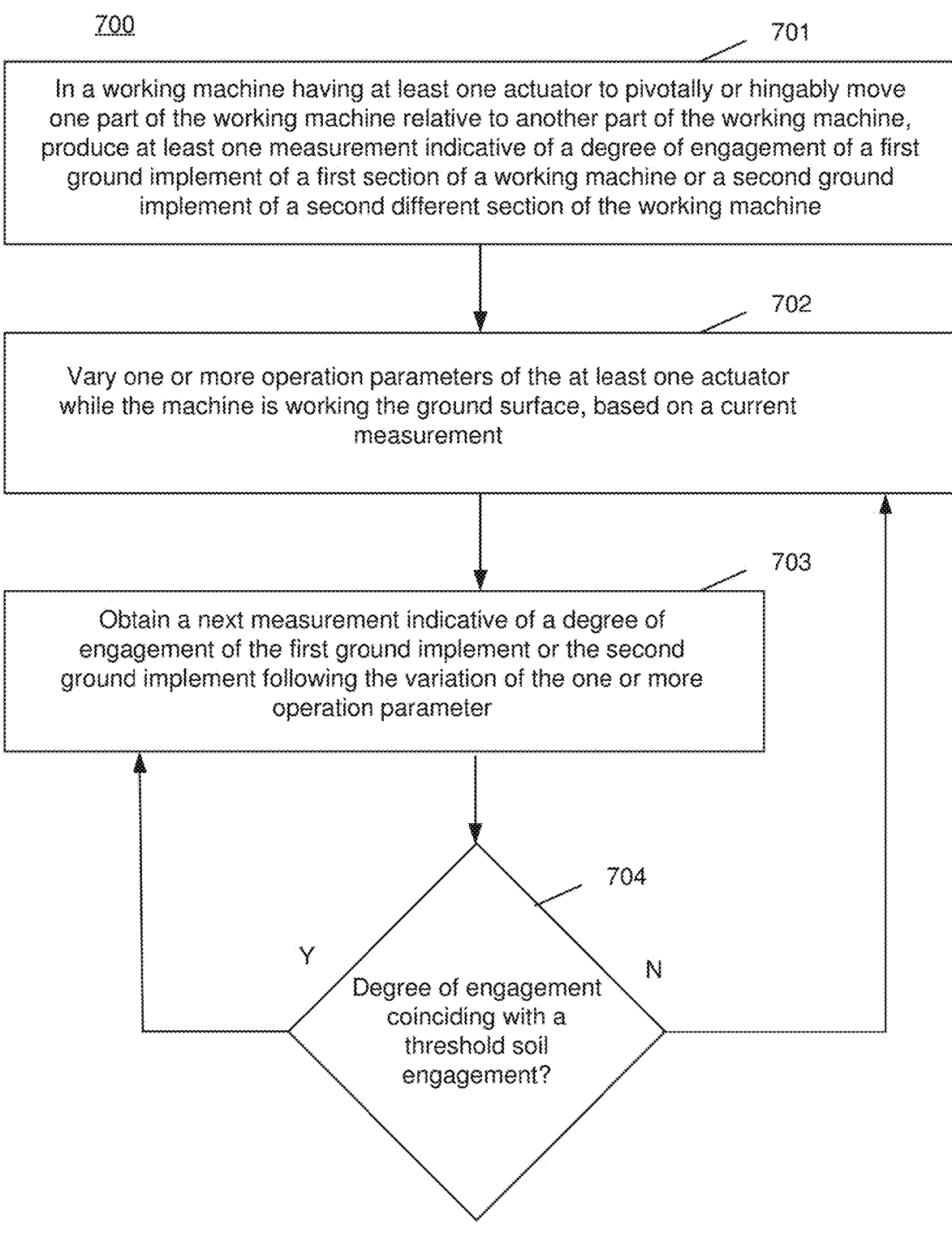

700                                                    701

In a working machine having at least one actuator to pivotally or hingably move one part of the working machine relative to another part of the working machine, produce at least one measurement indicative of a degree of engagement of a first ground implement of a first section of a working machine or a second ground implement of a second different section of the working machine

702

Vary one or more operation parameters of the at least one actuator while the machine is working the ground surface, based on a current measurement

703

Obtain a next measurement indicative of a degree of engagement of the first ground implement or the second ground implement following the variation of the one or more operation parameter

704

Y                                                      N

Degree of engagement coinciding with a threshold soil engagement?

FIG. 7

WORKING MACHINE WITH TRANSPORTATION CONFIGURATION ACTUATOR USED FOR WING LEVELING WHILE WORKING THE GROUND

PRIORITY

This application is a non-provisional of U.S. Provisional Application No. 63/396,180 filed on Aug. 8, 2022 and U.S. Provisional Application No. 63/396,187 filed on Aug. 8, 2022, each of which is incorporated by reference herein.

TECHNICAL FIELD

The present disclosure relates to off-highway working vehicles and other working machines, and some embodiments relate to using a transportation configuration actuator of a working machine for wing level while ground implements of the working machine work the ground and/or using a hitch tilt actuator for fore/aft leveling while ground implements of the working machine work the ground.

BACKGROUND

Off-highway working vehicles or other working machines, which may operate on steep or uneven ground, may include utility vehicles, such as tractors, lawnmowers, construction vehicles, agriculture vehicles, or the like. These working machines may have transportation systems, such as wheels, treads, walking devices, crawlers, or the like, to transport the working machine from one location to another. A motorized transportation system may be powered by any power source, such as a combustion engine, an electric motor, or the like, or combinations thereof.

In addition to the transportation system, these working machines may include tools for performing a work task, such as a residential operation, commercial operation, or industrial operation. Example work tasks may include mowing, spraying, harvesting, planting, digging, mining, leveling, or the like. These tools may also be referred to as implements, and may include:

Passive implements such as a plow that is pulled by a tractor, a trailer with a non-motorized transportation system, or the like; and Motorized implements, such as a powered hitch to position a plow, a mower, a digger, a lawn edger, or the like.

Various components of these working machines (e.g., motorized devices of the transportation system and/or a motorized implement), may be configured to operate autonomously (e.g., fully autonomously or semi-autonomously). A robotic lawn mower is one example of a working machine that may operate fully autonomously. A tractor having an auto-steering system interfacing with the steering wheel (or steering wheel column) is one example of a semi-autonomous working vehicle (because an operator may manually steer the vehicle using the steering wheel).

BRIEF DESCRIPTION OF THE DRAWINGS

FIGS. 4A and 4B illustrate side views of a working vehicle including the working machine of FIG. 3, working level ground without and with fore/aft leveling, respectively.

FIG. 7 illustrates operations that may be performed by any working vehicle or other working machine described herein, according to various embodiments.

DETAILED DESCRIPTION

Figure 1A:
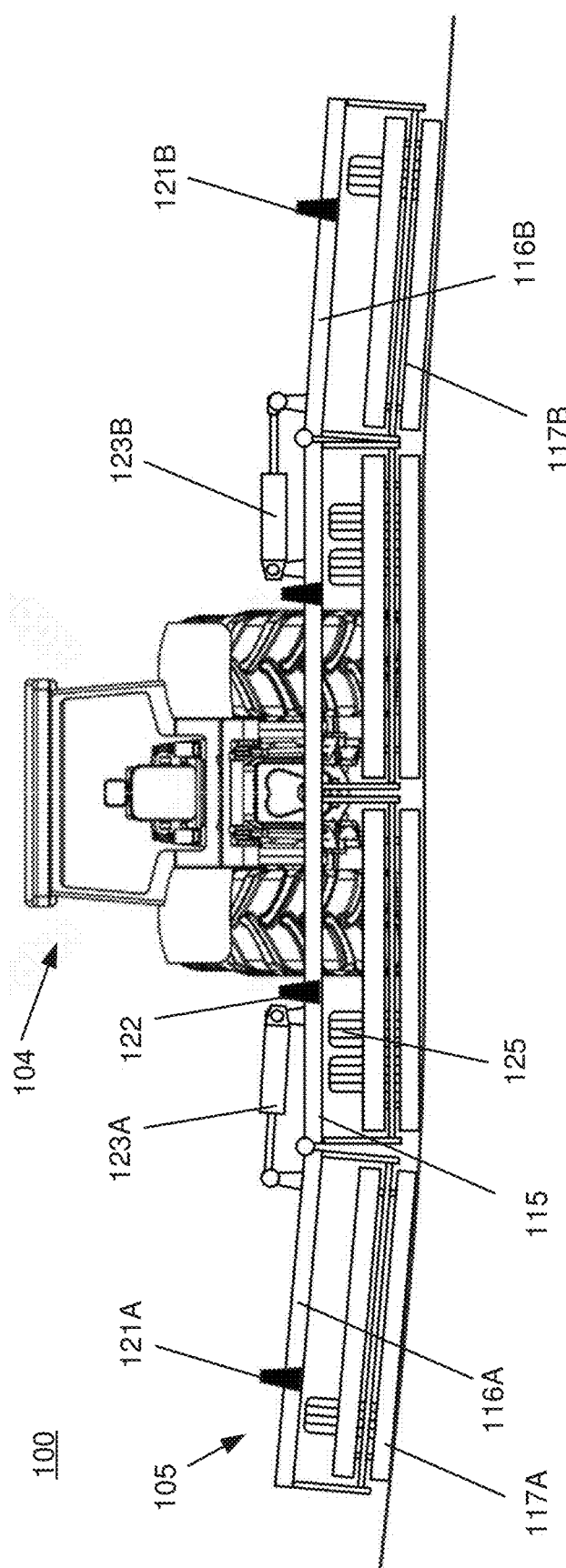
FIG. 1A illustrates a rear view of a working vehicle with transport configuration actuators used for wing leveling while ground implements of the working vehicle are working the ground, according to various embodiments.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Some working machines, such as agricultural tillage tools, are arranged for on-highway transport to move the working machine from one work site to another. These working machines may have two different configurations—a transport configuration that is used for on-highway transport and a working configuration that is used for working tasks, such as agricultural tillage.

As one example, an agricultural tillage tool may have wing assemblies that fold up to provide a transport configuration that has less width than a working configuration of the agricultural tillage tool. One or more actuator assemblies may drive reconfiguration from one configuration to the other. For example, the transportation system may include one or more hydraulic cylinders to fold up for on-highway travel and/or fold down the wing assemblies for performing work tasks.

Various embodiments described herein may use the transportation system device(s), e.g., the one or more hydraulic cylinders—for a dual purpose. In additional to using the hydraulic cylinder(s) for its traditional purpose, various embodiments may also use the hydraulic cylinder(s) while working the ground, which may provide improved working efficiency with minimal added cost. These embodiments may include circuitry having sensors to produce measurements indicative of degrees of engagement of ground implements with corresponding parts of the ground. The circuitry may include a processing device to autonomously operate the hydraulic cylinder while the working machine is working the ground, to optimize engagement of the ground implements of the wing assemblies or other ground implements of the working machine with the ground. In some examples, the processing device may control a valve of the hydraulic cylinder while the working machine is working the ground, based on the measurements, to vary pressure of the hydraulic cylinder in order to optimize the engagement of the ground implements with the ground.

Various embodiments may alternatively or additionally use another transportation system device, e.g., the hitch tilt cylinder, for a dual purpose. These embodiments may include circuitry having sensors to produce at least one measurement indicative of degree of engagement of a fore or aft ground implement with the ground surface. The circuitry may include a processing device to autonomously operate the hitch tilt cylinder while the working machine is working the ground, to optimize engagement of the fore and aft ground implements of the working machine with the ground. In some examples, the processing device may control a valve of the hitch tilt sensor while the working machine is working the ground, based on the at least one measurement, to vary pressure of the hydraulic cylinder in order to optimize the engagement of the fore and aft implements with the ground.

Figure 2:
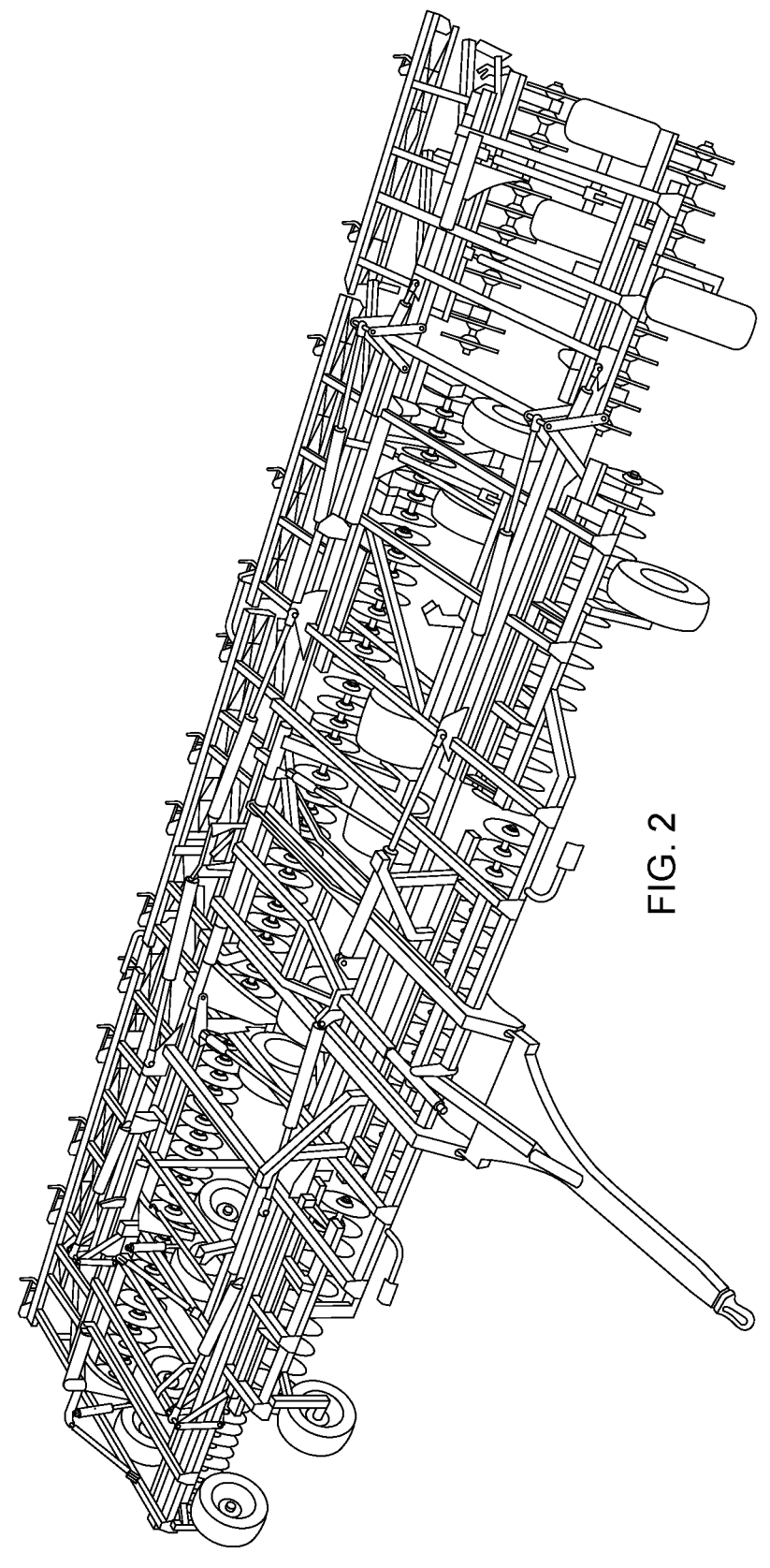
FIG. 2 illustrates a view of a working machine with a transportation system to fold up wing assemblies in a transport configuration having a reduced width for transport.

FIG. 1A illustrates a rear view of a working vehicle 100 with transport configuration actuators 123A and 123B used for wing leveling while ground implements of the working vehicle 100 are working the ground, according to various embodiments. The working vehicle 100 includes a tractor 104 and a working machine 105 (e.g., a towed implement) having a transportation system including wheels 125 and actuators 123A and 123B for folding up the wing assemblies 116A and 116B, respectively. FIG. 2 is a view of a working machine with a transportation system similar to the transportation system of the working machine 105 of FIG. 1A.

Referring again to FIG. 1A, the working machine 105 includes a frame having a center frame assembly 115 and folding frame assemblies 116A and 116B (which may also be referred to as folding wings or wing assemblies). The working machine 105 is transportable in a transportation configuration in which the folding frame assemblies 116A and 116B are folded up, which reduces a width of the working machine for transport (e.g., on-highway transport). At a work site on a level field, the working machine 105 operates in a working configuration, in which the folding frame assemblies 116A and 116B are unfolded and all the ground implements may have uniform engagement with the ground.

Figure 1B:
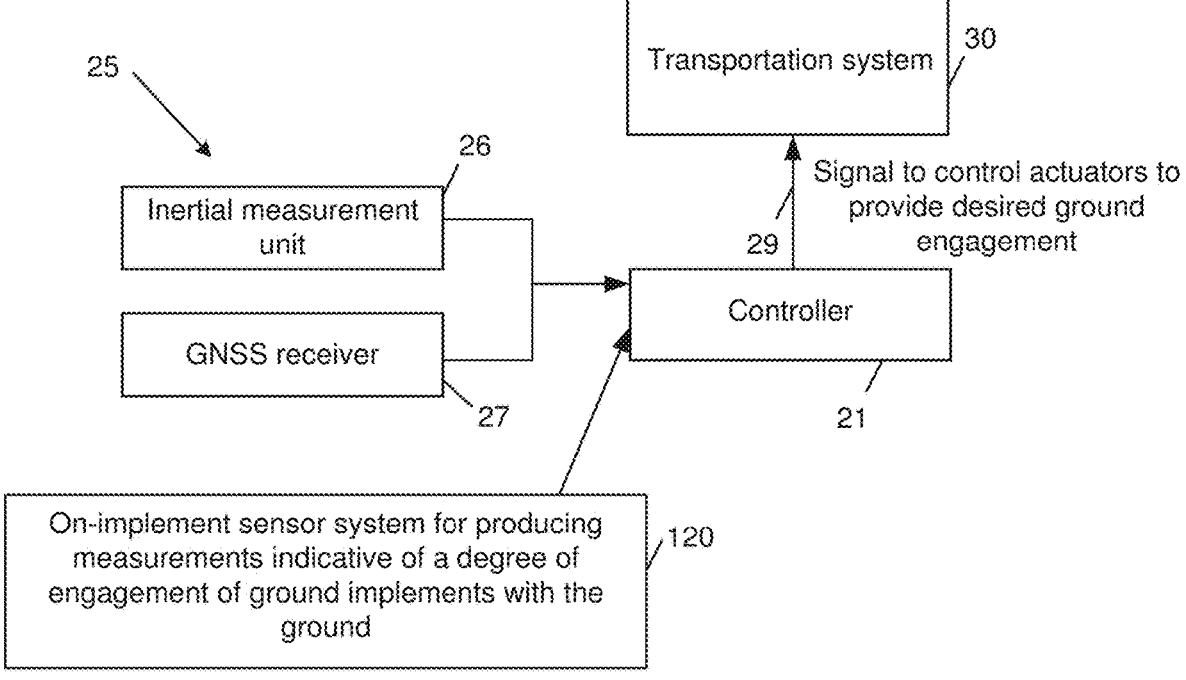
FIG. 1B illustrates a schematic diagram of the working vehicle of FIG. 1A.

At a work site with an unlevel field, the working configuration may produce non-uniform engagement of the ground implements with the ground, which may limit effectiveness of the working machine in working the ground across a width of the working machine 105 and/or may impact operation of the tractor (may impact operation of an auto-steering system of the tractor 104). Referring variously to FIGS. 1A and 1B, the working vehicle 100 (e.g., the implement 105 and/or the tractor 104) may include a controller 21 to control transportation system 30 (e.g., the actuators 123A and 123B of FIG. 1A) while the working machine 105 is in a working configuration (e.g., while the working machine 105 is working the uneven ground).

In addition to legacy sensors 25 (which may include sensors such as a GNSS receiver 27 and an IMU 26, which may be used for auto-steering and which may be located on the tractor 104 and/or the working machine 105), the working vehicle 100 may include a sensor system 120 on the implement 105 to produce measurements indicative of a degree of engagement of ground implements of the working machine 105 with the ground. The sensor measurements, or data derived therefrom, may be input into the controller 21. When the input indicates non-optimal engagement of at least one ground implement of the working machine 105 with the ground (e.g., soil engagement that is non-coinciding with a threshold soil engagement), the controller 21 may output a control signal to vary operation of at least one of the actuators 123A and 123B to correct soil engagement of any of the ground implements such as the ground implements 117A and 117B of the folding assemblies 117A and 117B respectively, or the ground implements of the center assembly 115.

In various embodiments, the controller 21 may utilize any legacy sensors 25 of the working vehicle 100 and/or an on-implement sensor system 120 as inputs to generate an output signal 29 to control device(s) of the transportation system 30. In some embodiments, the on-implement sensor system 120 may include ultrasonic sensors and/or radar sensors. In the illustrated embodiment, the on-implement sensor system 120 may include sensors 121A and 121B on the folding frame assemblies 116A and 116B, and sensors 122 on the center frame assembly 115. Other embodiments may include more or less sensors than what is illustrated in this example, and any sensors used to generate the signal 29 may be part of legacy sensors 25, and may be on-implement sensors or off-implement sensors.

FIG. 1A illustrates an example in which the ground is uneven, to describe operations performed by the working vehicle 100. When the working vehicle 100 moves from even ground (not shown) to the illustrated uneven ground, the controller 21 may detect non-optimal soil engagement based on readings collected by the sensor system 120. In some embodiments, the sensor system 120 may provide distance measurements, and detection by the controller 21 may be an inference of undesired and/or non-uniform soil engagement based on differences in distance measurements produced by the different sensors.

In response to the detected non-optimal soil engagement, using the actuators 123A and 123B of the transportation system, the controller 21 may increase downforce applied to the folding frame assembly 116B. This increase of downforce may produce downward movement of the folding frame assembly 116B relative to the center frame assembly 115, which may correct a non-optimal soil engagement of the ground implement 117B or any other ground implement of the working machine 105.

The controller 21 may also reduce downforce applied to the folding frame assembly 116A (which may include eliminating downforce applied by the actuator 123A in some examples). This decrease in downforce may produce upward movement of the folding frame assembly 116A relative to the center frame assembly 115, which may correct the non-optimal soil engagement of the ground implement 117A or any other ground implement of the working machine 105.

The controller 21 may be implemented using any processing devices, now known or later developed. Processing device(s) of the controller may be the same processing devices that perform other working vehicle or working machine operations, such as autosteering operations. However, the controller 21 may use dedicated processing devices coupled to an auto-steering system or some other existing processing device of the working vehicle 100. In some examples, the controller 21 may include one or more general purpose processors to execute instructions stored on a hardware memory to implement any working vehicle or working machine operations described herein. In other examples, the controller may include application-specific processing devices, such as logic.

Figure 3A:
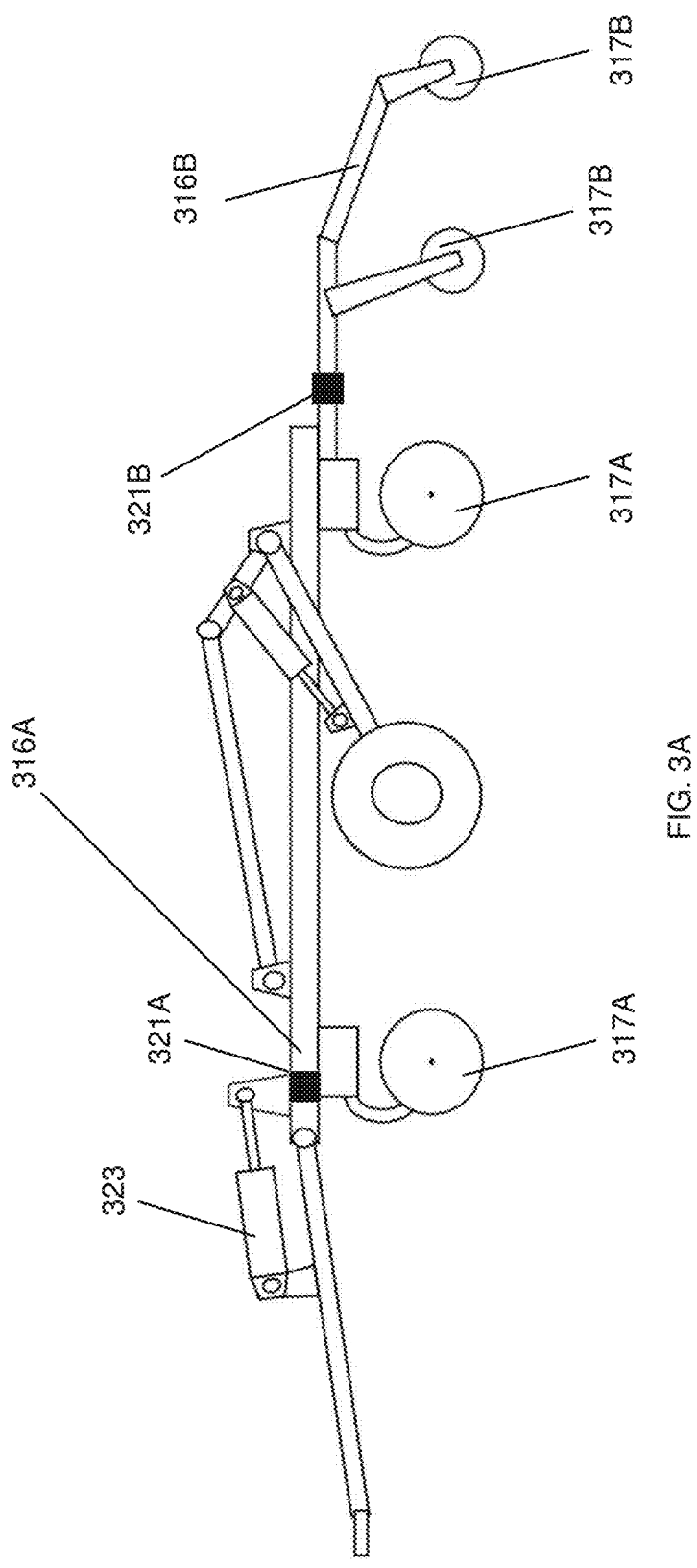
FIG. 3A illustrates a side view of a working machine with a hitch tilt actuator used for fore/aft leveling while ground implements of the working machine are working the ground, according to various embodiments.
Figure 6:
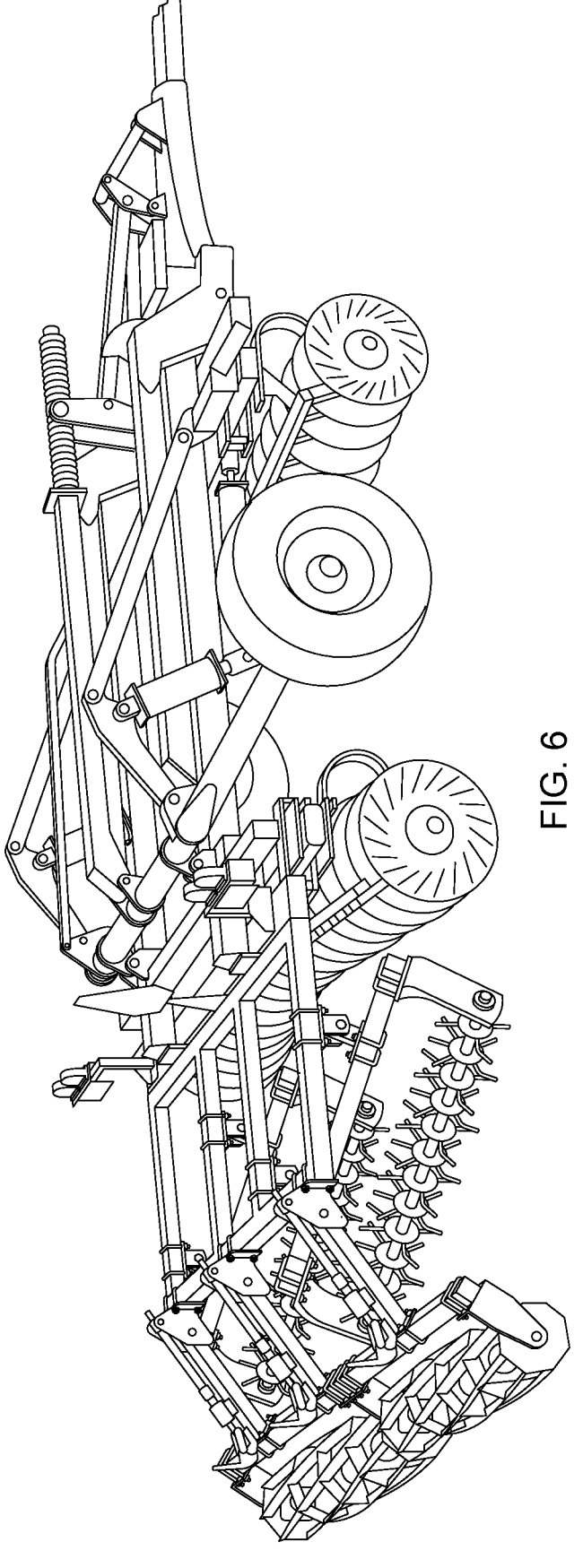
FIG. 6 illustrates a view of a working machine with a transportation system including a hitch tilt actuator, according to various embodiments.

FIG. 3A illustrates a side view of a working machine 305 with a hitch tilt actuator 323 used for fore/aft leveling while ground implements of the working machine 305 are working the ground, according to various embodiments. The hitch tilt actuator 323 may be part of a transportation system including a known transportation vehicle, which may use the hitch tilt actuator 323 for transportation operations that are part of on-highway transport of the working machine 305. FIG. 6 illustrates a view of a working machine having a transportation system similar to the transportation system of the working machine 305.

Referring again to FIG. 3A, the working machine 305 includes a transportation system including the illustrated transportation devices (e.g., wheels) and the hitch tilt actuator 323, which pivotally or hingeably moves one part of the working machine 305 relative another part of the working machine as illustrated in FIGS. 4A, 4B, 5A, and 5B.

Referring again to FIG. 3A, the working machine 305 is also operable in a transportation configuration—where the hitch tilt actuator 323 is connected to a transport vehicle that may tow the working machine 105 on a highway. At a work site, the working machine 105 operates in a working configuration, in which the ground implements 317A and 317B of the frame sections 316A and 316B, respectively, may work the ground.

Figure 3B:
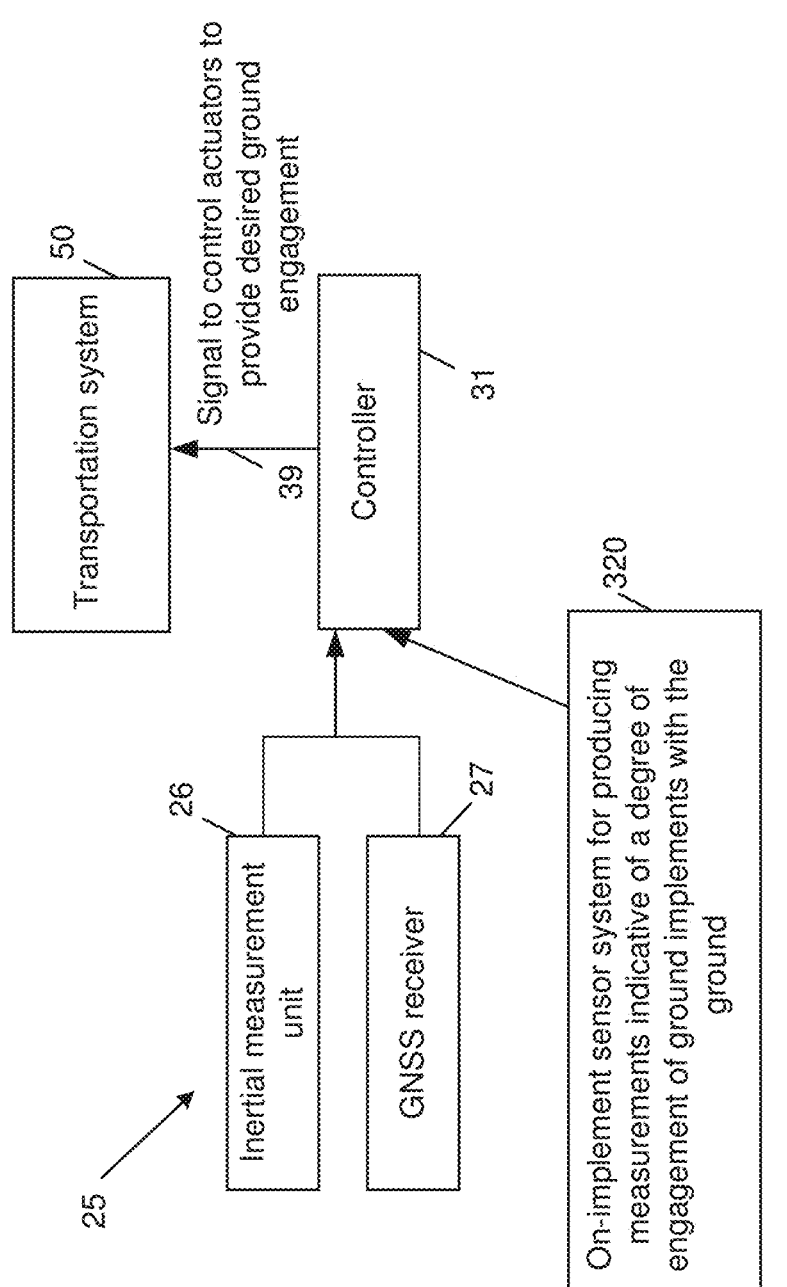
FIG. 3B illustrates a schematic diagram of the working vehicle of FIG. 3A.

The working configuration may produce non-optimal engagement of at least some of the ground implements with the ground, which may limit the effectiveness of the working machine 305 in working the ground or impact operation of the tractor 305 (FIG. 4A). Referring variously to FIGS. 3A and 3B, the working vehicle 300 may include a controller 31 to control the transportation system 50 while the working machine 305 is in a working configuration (e.g., while the working machine 305 is working the ground).

The working vehicle 300 may include any sensors described herein, and may also include an on-implement sensor system 320 to produce measurements indicative of a degree of engagement of ground implements of the working machine 305 with the ground. The on-implement sensor system 320 may be similar to any on-implement sensor system described herein. The sensor measurements, or data derived therefrom, may be input into the controller 31. When the controller 31 detects non-optimal engagement of at least one ground implement of the working machine 305 with the ground based on the sensor input (e.g., detected soil engagement that is non-coinciding with a threshold soil engagement), the controller 31 may generate a signal 39 to vary operating of the transportation system 50 to correct soil engagement of any of the ground implements such as the ground implements 317A and 317B.

In some embodiments, the sensor system 130 may include sensors 321A and 321B of the implement sections 316A and 316B, respectively. Other embodiments may include more or less sensors than what is illustrated in this example, and any sensors used to generate the signal 39 may be part of legacy sensors 25, and may be on-implement sensors or off-implement sensors.

FIGS. 4A and 4B illustrate an example in which the ground is even, to describe operations performed by the working vehicle 300. The controller 31 may detect non-optimal soil engagement based on readings collect by the sensor system 320. In some embodiments, the sensor system 120 may provide distance measurements, and detection by the controller 21 may be an inference of undesired and/or non-uniform soil engagement based on differences in distance measurements produced by the different sensors.

In response to the detected non-optimal soil engagement, using the hitch tilt actuator 323 of the transportation system 130, the controller 31 may increase or decrease a pressure corresponding to the hitch tilt actuator 323 (e.g., by controlling a valve of a hitch tilt cylinder). This variation of pressure may produce downward movement of the second section 316B relative to the first section 316A to the position illustrated in FIG. 4B, which may correct a non-optimal soil engagement of the ground implements 317A and 317B. FIG. 4B illustrates the optimized soil engagement provided by the variation of pressure—the excessive soil engagement of a foremost one of the ground implements 317A shown in FIG. 4A has been corrected. Also, the ground implements 317B and another one of the ground implements 317A are shown in FIG. 4B with optimal soil engagement.

Figures 5A, 5B:
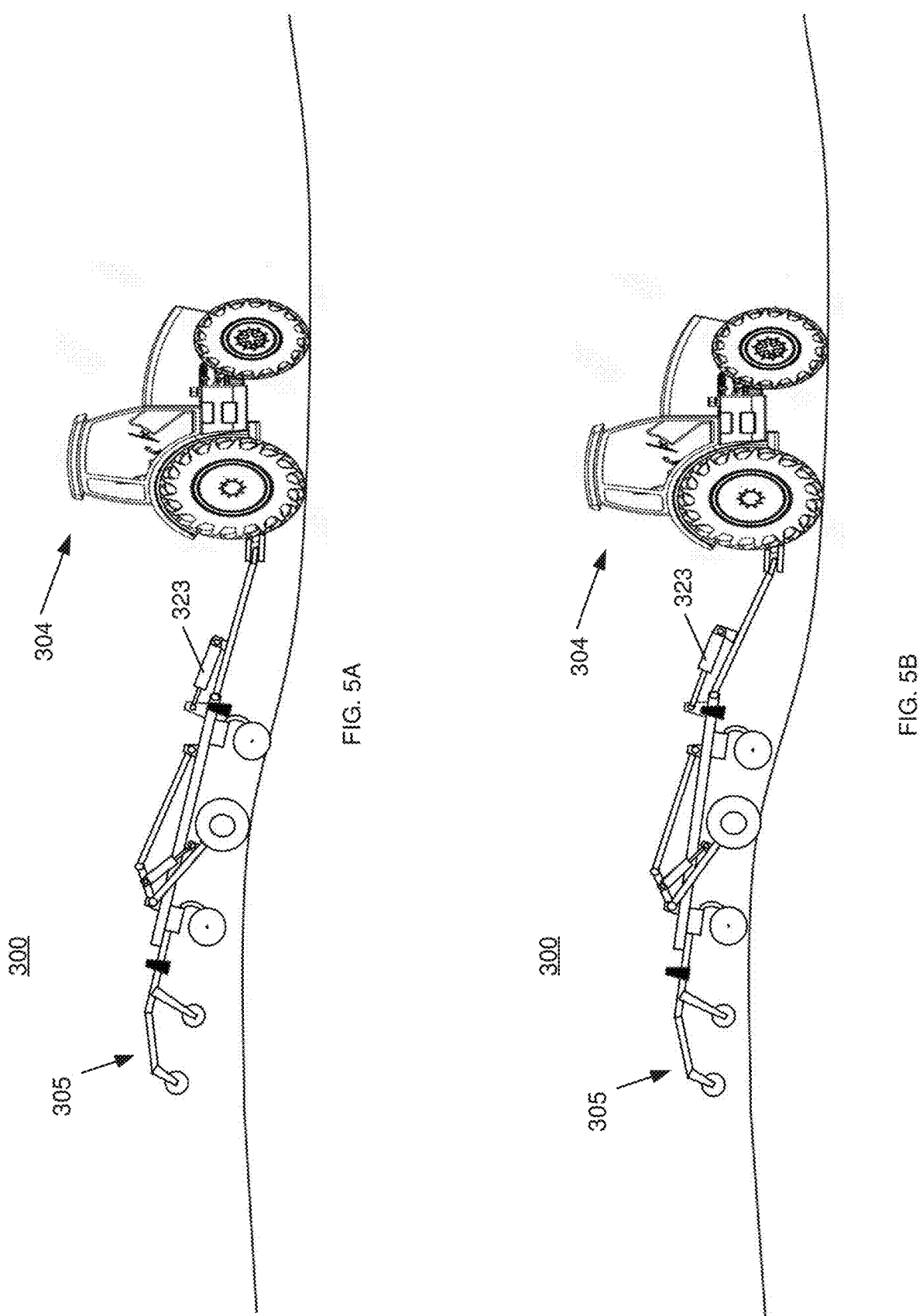
FIGS. 5A and 5B illustrate side views of the working vehicle of FIGS. 4A-B, working non-level ground without and with fore/aft leveling, respectively.

FIGS. 5A and 5B illustrate an example in which the ground is uneven to further describe operations performed by the working vehicle 300. The controller 31 may detect non-optimal soil engagement based on readings collected by the sensor system 320. In some embodiments, the sensor system 320 may provide distance measurements, and detection by the controller 31 may be an inference of undesired and/or non-uniform soil engagement based on differences in distance measurements produced by the different sensors.

In response to the detected non-optimal engagement, using the hitch tilt actuator 323 of the transportation system 130, the controller 31 may increase or decrease a pressure corresponding to the hitch tilt actuator 323. This variation of pressure may produce downward movement of the second section 316B relative to the first section 316A, which may correct a non-optimal soil engagement of the ground implements 317A and 317B. FIG. 5B illustrates the optimized soil engagement provided by the variation of pressure—the excessive soil engagement of a foremost one of the ground implements 317A shown in FIG. 4A has been corrected. Also, the ground implements 317B and another one of the ground implements 317A are shown in FIG. 5B with optimized soil engagement.

The controller 31 may be implemented using any processing devices, now known or later developed. Processing device(s) of the controller may be the same processing devices that perform other working vehicle or working machine operations, such as autosteering operations. However, the controller 31 may use dedicated processing devices coupled to an auto-steering system or some other existing processing device of the working vehicle 300. In some examples, the controller 31 may include one or more general purpose processors to execute instructions stored on a hardware memory to implement any working vehicle or working machine operations described herein. In other examples, the controller may include application-specific processing devices, such as logic.

In various embodiments, a working vehicle or other working machine may include any combination of the assemblies described herein. For example, the working vehicle or other working machine may include any folding assemblies described herein and/or any hitch tilt assembly described herein. The working vehicle or other working machine may perform any working vehicle/machine operations described herein, such as wing leveling operations and/or fore/aft leveling. Wing leveling operations and fore/aft leveling operations may be performed by a same controller of the working vehicle/machine or different controllers of the working vehicle/machine at the same time or at different times.

FIG. 7 illustrates operations 700 that may be performed by any working vehicle or other working machine described herein, according to various embodiments. In a working machine having at least one actuator to pivotally or hingeably move one part of the working machine relative to another part of the working machine, in block 701 operations 700 may produce at least one measurement indicative of a degree of engagement of a first ground implement of a first section of a working machine or a degree of engagement of a second different ground implement of a second different section of the working machine.

In various embodiments, the first and second sections may be wing assemblies of the working machine, or fore and aft sections of the working machine. In various embodiments, the at least one actuator may include any motorized device of a transportation system of the working machine, such as actuators to fold up wing assemblies of the working machine for on-highway transport and/or a hitch tilt actuator for on-highway transport of the working machine.

In block 702, the operations 700 may vary one or more operation parameters of the at least one actuator while the working machine is working the ground surface, based on whether a current measurement is equal to, or coincides within a threshold, with a reference value. The reference value may be equal to, or derived from, a current measurement corresponding to a different section of the working machine. In other examples, a reference value may be a uniform value for the work site, or a characteristic for a location indicated on a prescriptive map.

In various embodiments, the one or more operation parameters may include a characteristic of a transport configuration actuator (such as pressure for a hydraulic cylinder), or a characteristic of a hitch tilt actuator (such as pressure for a hydraulic cylinder). In examples using hydraulic cylinders, the characteristic may be a pressure, but in examples using other actuators some other operation parameter of the actuators may be varied.

After varying the one or more operation parameters, in block 703 the operations 700 may include obtaining a next measurement indicative of a degree of engagement of the first ground implement or the second ground implement. If the degree of engagement is not coinciding with a threshold soil engagement in diamond 704, then the operations 700 may return to block 702. If the degree of engagement is coinciding with the threshold soil engagement in diamond 704, then the operations 700 may return to block 703.

In various embodiments with fore/aft leveling, the operations 700 may include maintaining a frame position tangent to the soil profile in the direction of travel over undulating terrain. In these examples, the operations 700 may include comparing one of the measurements that corresponds to the first section to one of the measurements that corresponds to the second section—to determine whether the measurements are equal, or coinciding within a predefined threshold.

Figure 8:
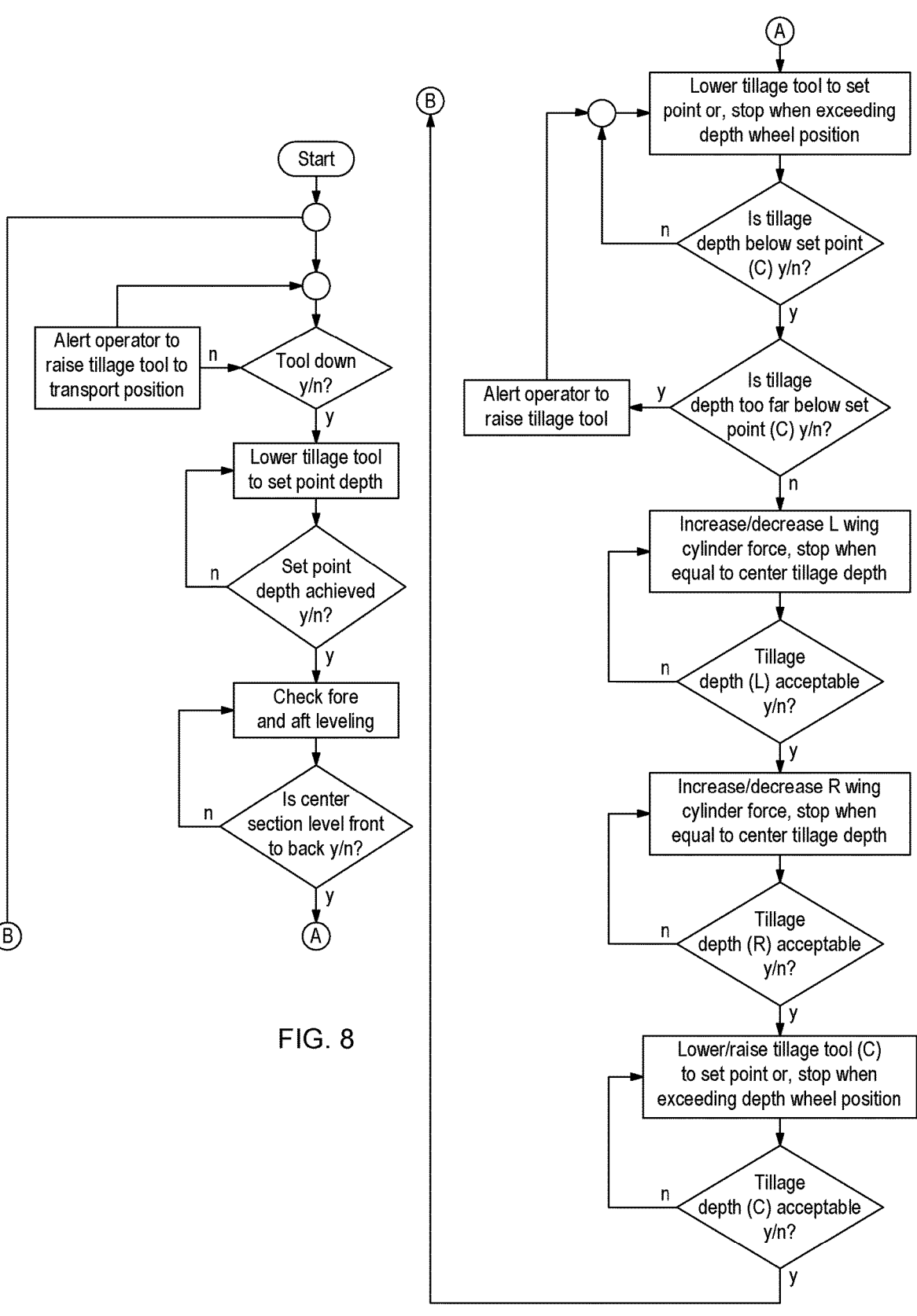
FIG. 8 illustrates an algorithm that may be used by any working vehicle or other working machine described herein to provide uniform soil engagement across a width and/or length of the working vehicle or other working machine, according to various embodiments.

FIG. 8 illustrates an algorithm that may be used by any working vehicle or other working machine described herein to provide uniform soil engagement across a width and/or length of the working vehicle or other working machine, according to various embodiments. The operations illustrated on the left side of the illustrated flow chart may be performed to provide uniform soil engagement across a length of the working vehicle or other working machine (e.g., uniform fore/aft soil engagement). The operations illustrated on the right side of the illustrated flowchart may be performed to provide uniform engagement across a width of the working vehicle or other working machine (e.g., uniform wing/center soil engagement).

Primary and secondary agricultural tillage tools perform optimally when all soil engaging components are working at the desired depth. Unfortunately, depth control via support wheel may be insufficient when utilizing tillage tools with folding wings (which facilitate transport between fields). Traditionally, the end user unfolds the tillage tool having either one or two wings on either side. The wings can either be locked in position with the hydraulic cylinders that actuate the wind-fold feature, or more recently by application of a set downforce at each wing (controlled pressure at wing cylinders).

Unfortunately, ground conditions often vary across the working width of the tool. These variations include undulating terrain as well as soil strength. When monitoring the action of traditional winged tillage tools, end users often notice significant differences of soil-tool engagement final soil surface finish across the working width of the tool. In various embodiments, a wing downforce control system may utilize radar, or other suitable ranging devices, to monitor the distance from the center and wing frames to the soil surface to assess the uniformity of soil-tool engagement across the working with of the tillage tool. Should any of the wing frame to soil surface distances be less than the center section frame to soil surface distance, wing down-pressure may be reduced, or vice versa. Ultimately, it will be preferable to adjust the down-pressure independently by wing section to achieve uniform soil-tool engagement across the working width of the tool.

Primary and secondary agricultural tillage tools perform optimally when the horizontal axis of the frame is maintained tangent to the soil profile in the direction of travel. Traditionally, the end user adjusts the various soil engaging tool stops to achieve the desired tillage action and surface finish. The user then operates the tillage at recommended ground speed over level ground to ensure the fore-aft distal ends of tool are parallel to the soil surface. If not, manual adjustment of the hitch to frame angle is made via a turnbuckle or hydraulic cylinder.

In various embodiments, a control system may utilize radar, or other similar ranging devices, to assess the fore-aft distance from the tillage tool frame to the ground, and if necessary, actuate the hydraulic tilt cylinder at the implement hitch to raise or lower the front of the tillage tool frame relative to the tractor hitch, thereby bringing either sensor value within an acceptable range (dead band) of each other. This approach may maintain the frame position tangent to the soil profile in the direction of travel over undulating terrain (tractor hitch point is always behind the center of the rear axle) and as soil-tool draft: engagement changes with variation in soil resistance.

This approach may also support prescriptive tillage. In prescriptive tillage, it may be necessary to Change the tillage tool to frame angle as adjustments to tillage tool positions or applied downforce(s) are changed in accordance with a prescriptive map and or real-time sensor techniques (i.e. surface residue, soil compaction, aggregate surface finish, etc.)

Controlling a Transportation System Based on a Prescriptive Map Input

Working machines may use prescriptive maps to determine operations to perform at different locations on a work site. For example, a prescriptive map may specify a different tillage depth at one region of a field than another. A working machine may determine whether its current location corresponds to the specified region from the prescriptive map using the sensors 25 (FIG. 1).

Any controller described herein may obtain the prescriptive map as an input, in addition to the sensor inputs. The prescriptive map may be received from the cloud, from a server, a mobile device, from another nearby working machine, or the like. The controller may control a motorized device transportation system based one or more characteristics specified by the prescriptive map.

In some embodiments, the controller may prioritize the specified characteristic from the prescriptive map, when it conflicts with a uniform soil engagement across a depth or width of the machine. For example, when the controller determines that the working machine's current location is coinciding with one of the predefined characteristic for that location, the controller may control the transportation system based on the predefined operation for that location. As one example, if the prescriptive map specifies deeper or shallower soil depth for part of a region covered by a width of the working machine, the controller may vary the at least one actuator to provide ground tool engagement corresponding to the specified soil depth from the map. The controller may target a different soil engagement for one section of the working machine than another section of the working machine to work the corresponding part of the field according to the prescriptive map.

As another example, the controller may reduce a downforce applied to a wing assembly to traverse an obstacle indicated on the prescriptive map and provide the specified tillage at that location while doing so. In another example, the controller may reduce pressure of the hitch tilt assembly to traverse an obstacle indicated on the prescriptive map and provide the prescribed tillage at that location while doing so.

Working Machines with Different Sections and/or Trains of Soil Engaging Implements To provide improved counter following, any section of a working machine (such as a fore or aft section, or a wing section) may include plural subsections. The subsections may be pivotally or hingeably connected.

In embodiments in which a working machine has these subsections, additional sensor(s) to enable any controller described herein to detect non-optimal soil engagement by ground implements of any ground implement of the working machine, such as a ground implement of an individual one of the subsections or some other ground implement of the working machine. The controller may vary one or more operational parameters of a corresponding actuator (e.g., an additional hydraulic cylinder between the subsections) to correct the detected non-optimal soil engagement, to provide uniform soil engagement across a width and/or length of the working machine.

In view of the many possible embodiments to which the principles of the disclosed technology may be applied, it should be recognized that the illustrated embodiments are only preferred examples and should not be taken as limiting the scope of the disclosure.

The invention claimed is:

1. A working machine, comprising:
a center frame assembly;
a first wing assembly coupled at a first hinge to a first end of the center frame assembly;
a second wing assembly coupled at a second hinge to a second end, opposite the first end, of the center frame assembly;
ground implements configured to work a ground surface, including a center ground implement of the center frame assembly, a first ground implement of the first wing assembly, and a second ground implement of the second wing assembly;
a first actuator coupled to the first wing assembly and the center frame assembly for pivoting the first wing assembly about the first hinge between a transport configuration which reduces a width of the working machine and a working configuration;
a second actuator coupled to the second wing assembly and the center frame assembly for pivoting the second wing assembly about the second hinge between the transport configuration and the working configuration;
transportation devices operable to transport the working machine;
sensors to produce measurements indicative of a degree of engagement of the first ground implement with a first part of the ground surface, and a degree of engagement of the second ground implement with a second part of the ground surface; and
one or more processors to activate the first and second actuators based on the measurements to pivot the first wing assembly about the first hinge and to pivot the second wing assembly about the second hinge while the ground implements work the ground surface.

2. The working machine of claim 1, further comprising at least one additional sensor to produce at least one center measurement indicative of a degree of engagement of the center implement with the ground surface, the one or more processors are configured to activate the first actuator to pivot the first wing assembly about the first hinge to equalize the degree of engagement of the first ground implement with the degree of engagement of the center implement.

3. The working machine of claim 1, wherein the first and second actuators comprise hydraulic cylinders.

4. The working machine of claim 3, further comprising valves to change pressures of the hydraulic cylinders, the one or more processors are configured to control the valves based on the measurements, to vary the pressures as the work machine works a non-level part of a field.

5. The working machine of claim 1, wherein the one or more processors are configured to vary actuator forces of the first and second actuators until the measurements are equal, or are coinciding within a threshold, to a reference value.

6. The working machine of claim 5, further comprising at least one additional sensor to produce at least one center measurement indicative of a degree of engagement of the center implement with the ground surface, the reference value comprises, or is derived from, the at least one center measurement.

7. The working machine of claim 1, wherein the measurements comprise distance measurements between reference locations on the first and second wing assemblies and the first and second parts, respectively, of the ground surface.

8. The working machine of claim 1, wherein the one or more processors are configured to activate the at least one of the first or second actuators based on an input from a prescriptive map to provide a prescribed tillage at an indicated location.

9. The working machine of claim 1, wherein the sensors comprise at least one of ultrasonic sensors or radar sensors.

10. A working vehicle including the working machine of claim 1.

11. The working machine of claim 1, wherein the first actuator spans the first hinge, and the second actuator spans the second hinge.

12. The working machine of claim 2, wherein:
the one or more processors are configured to activate the second actuator to pivot the second wing assembly about the second hinge to equalize the degree of engagement of the second ground implement with the degree of engagement of the center implement.

13. The working machine of claim 2, wherein:
the measurements indicate a distance of the first ground implement from the first part of the ground surface, and the at least one center measurement indicates a distance of the center implement from a corresponding part of the ground surface; and
the one or more processors are configured to activate the first actuator to pivot the first wing assembly about the first hinge to equalize the distance of the first ground implement from the first part of the ground surface with the distance of the center implement from the corresponding part of the ground surface.

14. The working machine of claim 1, wherein:
the degree of engagement of the first wing assembly comprises a respective tillage depth; and
the degree of engagement of the second wing assembly comprises a respective tillage depth.

15. The working machine of claim 1, wherein the one or more processors are configured to activate at least one of the first or second actuators based on an input from a prescriptive map.

16. The working machine of claim 1, wherein the one or more processors are configured to reduce or eliminate a downforce applied to the first wing assembly to traverse an obstacle indicated on a prescriptive map.

17. An apparatus comprising:
a working machine comprising 1) a frame assembly including first and second sections, wherein the first and second sections comprise foldable assemblies pivotally connected to opposing ends of a center frame assembly, 2) ground implements to work a ground surface, the ground implements comprising a first ground implement of the first section and a second ground implement of the second section, and 3) a transportation system including transportation devices and at least one actuator configured to fold the foldable assemblies over the center frame assembly to a transportation configuration which reduces a width of the working machine and to unfold the foldable assemblies to a working configuration in which the foldable assemblies extend away from the center frame assembly;
the working machine further including:
at least one sensor to produce at least one measurement indicative of a degree of engagement of at least one of the first or second ground implements with a corresponding part of the ground surface; and
one or more processors to operate the at least one actuator while the working machine is working the ground surface, based on the at least one measurement.

18. The apparatus of claim 17, wherein:
the one or more processors are configured to determine whether a location of the first ground implement coincides with a reference location indicated by a prescription map; and
the one or more processors are configured to operate the at least one actuator based on a prescribed value for the reference location, if the location of the first ground implement coincides with the reference location.

19. A working vehicle including the apparatus of claim 17.

\* \* \* \* \*